July 26, 1960  T. A. HALE ET AL  2,946,172
LAWN EDGE TRIMMER
Filed Dec. 13, 1957

INVENTOR.
THEODORE A. HALE
WAYNE F. MORGAN
BY
John R. Walker, III
Attorney 2,946,172
Patented July 26, 1960

2,946,172
LAWN EDGE TRIMMER

Theodore A. Hale, 189 N. Rose Road, and Wayne F. Morgan, Larkspur Drive, both of Memphis, Tenn.

Filed Dec. 13, 1957, Ser. No. 702,598

3 Claims. (Cl. 56—25.4)

This invention relates to a grass trimmer particularly adapted for trimming the grass along the edge of a lawn.

Numerous types of edge trimmers have heretofore been proposed and most of them have not been entirely satisfactory for one reason or another. In a number of these devices the power to cut the grass must be supplied manually by the operator pushing the device, thereby requiring a great deal of effort. Other of the devices employ a circular cutting wheel driven by a motor. In this latter type the cutting wheel is easily damaged and becomes dull by the blade striking rocks and the edge of the sidewalk.

Therefore, the present invention is directed towards providing an edge trimmer which overcomes many of the disadvantages of previous types of trimmers.

One of the objects of the present invention is to provide a highly efficient lawn edge trimmer which requires very little effort to operate.

A further object is to provide a lawn edge trimmer of such a construction that the blades are not easily damaged.

A further object is to provide a trimmer which cuts the lawn edge in such an even and neat manner that the appearance of the lawn is greatly improved.

A further object is to provide a lawn edge trimmer with which the grass may be trimmed quickly.

A further object is to provide a lawn edge trimmer in which means is provided for insuring that the grass is properly fed into the cutter head thereof.

A further object is to provide a lawn edge trimmer comprising a wheeled carriage having a handle, a cutter head rotatably mounted from said carriage with the axis thereof being disposed in the direction of travel of the carriage, a motor mounted on said carriage and operably coupled to said cutter head for the rotational drive thereof, an elongated fixed blade mounted on said carriage and disposed to co-operate with said cutter head for cutting the grass, said elongated fixed blade extending forwardly of said cutter head for guiding the grass between the cutter head and the elongated fixed blade.

A further object is generally to improve the design and construction of lawn edge trimmers.

The means by which the foregoing and other objects of the present invention are accomplished and the manner of their accomplishment will be readily understood from the following specification upon reference to the accompanying drawings, in which.

Figure 1:
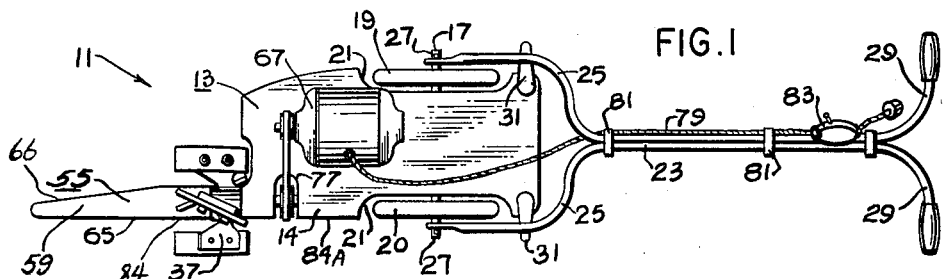
Fig. 1 is a plan view of the lawn edge trimmer of the present invention.

Referring now to the drawings in which the various parts are indicated by numerals, the lawn edge trimmer 11 of the present invention includes a carrier body 13 which is preferably, though not necessarily, formed in one integral piece. The main portion 14 of carrier body 13 extends substantially horizontally with a foot member 15 depending therefrom adjacent one side of the main portion and adjacent the forward part thereof.

An axle 17 is transversely mounted from carrier body 13 adjacent the rearward part thereof. Wheels 19, 20 are rotatably mounted adjacent opposite ends of axle 17 to provide a wheeled carriage 22 with the wheels being preferably recessed in recesses 21 provided on opposite sides of carrier body 13.

Figure 2:
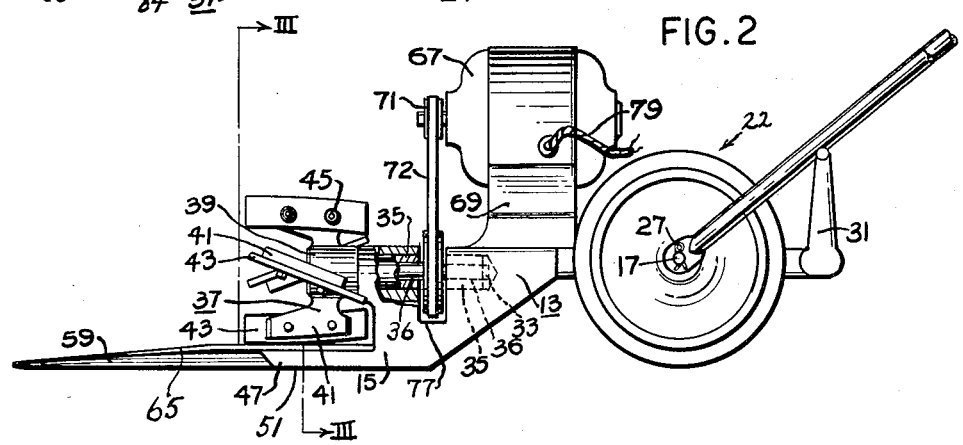
Fig. 2 is an enlarged fragmentary view of the trimmer with parts broken away for purposes of illustration.

A handle 23 is coupled to carriage 22 whereby the carriage is adapted to be pushed by hand. The means for coupling handle 23 to the carriage is preferably as shown in the drawings wherein it will be seen the handle is provided with a bifurcated end portion 25 with each branch having an aperture adjacent the end thereof which apertures respectively fit over the opposite ends of axle 17 outside of wheels 19, 20 and are held thereon as by means of cotter keys 27. The end of handle 23 opposite bifurcated end portion 25 is provided with handgrip portions 29. A pair of upstanding stops 31 are respectively formed integrally with carrier body 13 adjacent the respective rearward corners thereof. Stops 31 limit the downward movement of handle 23 and hold the handle at an inclined angle, as best shown in Fig. 2, when the handle is not being supported by hand.

A shaft 33 is rotatably mounted in carrier body 13 in bearings 35 which are mounted in an interrupted bore 36 provided in the carrier body and extending longitudinally of the carrier body adjacent the upper part of foot member 15. Thus, shaft 33 is disposed in a rearwardly and forwardly extending disposition and in the direction of movement of the carrier body 13. A portion of shaft 33 extends forwardly of carrier body 13 upon which portion is fixedly mounted a cutter head 37 for rotation with shaft 33. Thus, the cutter head rotates about an axis which extends longitudinally of the carrier body. Cutter head 37 comprises a hub 39 and a plurality of radially extending and spaced arms 41 which are preferably integrally formed with hub 39. A like plurality of cutter blades 43 are respectively fixedly and removably attached as by screws 45 adjacent the outer ends of arms 41. Arms 41 are formed with a twist therein so that cutter blades 43 are disposed at an angle relative to shaft 33. As will best be seen in Fig. 1, arms 41 are disposed in a clockwise twisted disposition when viewed from above, but it will be understood that the arms may be disposed in an opposite or counter-clockwise disposition without departing from the spirit and scope of the present invention.

Foot member 15 includes an integrally formed projection 47 forwardly extending from the main body of the foot member adjacent the lower edge thereof. Projection 47 includes a sloping upper surface 49 and a horizontal lower surface 51. Upper surface 49 slopes from adjacent the inner edge of projection 47 upwardly towards the outer edge thereof, the inner edge of the projection being the one to the left as viewed in Fig. 3 and the outer one being the edge to the right as viewed in this figure.

Upper surface 49, as above described, provides a seat for the rearward portion 53 of an elongated fixed blade 55, the blade being fixedly and removably secured in face-to-face engagement with projection 47 as by means of screws 57. Rearward portion 53 is disposed beneath cutter head 37 and so aligned that the rearward portion co-operates with the respective blades 43 as the cutter head is rotated. It will be understood that the outer edge of rearward portion 53 and the outer edges of blades 43 should be sharpened, as in conventional reel type of lawn mowers, so that the grass coming between rearward portion 53 and blades 43 will be cut. The forward portion 59 of blade 55 extends forwardly from projection 47 and is tapered towards the distal end thereof, as viewed in Fig. 1. Additionally, forward portion 59 is twisted or tilted from an angle of maximum slope adjacent rearward portion 53 to a substantially horizontal disposition adjacent the distal end thereof so that the outer edge 65 of forward portion 59 forms a gradually sloping guide for the grass, which is adapted to lift the blades of grass at the lawn edge from a flat position to a standing position when carrier body 13 is being pushed forwardly with fixed blade 55 moving under the blades of grass. In other words, in viewing the device from the front forward portion 59 is arranged so that the outer edge 65 at the end adjacent rearward portion 53 is higher than the opposite ground engaging edge 66 of forward portion 59 and so that the forward portion has a gradual clockwise twist from adjacent rearward portion 53 outward towards the viewer until the distal end of forward portion 53 is substantially horizontal.

Suitable motor means, as a high-speed electric motor 67, is mounted on carrier body 13 as by a support 69. A pulley 71 is fixedly mounted to the shaft of motor 67 and coupled by means of a continuous drive belt 72 to a pulley 73 fixedly mounted on shaft 33. Carrier body 13 is cut out as at 77 to allow space for pulley 73 to operate. A cord 79 is provided for supplying power to motor 67 from an external source. Cord 79 may be secured to handle 23 by suitable means as straps 81 extending around the cord and the handle. A switch 83 is preferably interposed in cord 79 adjacent handle 23 so that motor 67 may be turned off and on.

It should be noted that when viewed from above as in Fig. 1, blade 55 is offset to one side of carriage 22, so that the outer edge 84 of blade 55 is in substantial alignment with the outer edge 84A of trimmer 11 and the wheel 20 is disposed inwardly of the outer edge of blade 55 whereby lawn edge trimmer 11 is adapted to be pushed along a sidewalk parallel with the edge thereof with the outer edge of blade 55 being in close adjacency to the edge of the sidewalk. Additionally, it will be noted that the positioning and weight of the parts of lawn edge trimmer 11 is distributed so that in a normal "at rest" position the lawn edge trimmer is supported by wheels 19, 20 and foot member 15 with the distal end of blade 55 riding on the surface supporting the trimmer. The height of foot member 15 is preferably such that in the normal position above described main portion 14 of carrier body 13 will be disposed in a substantially horizontal disposition.

Figure 3:
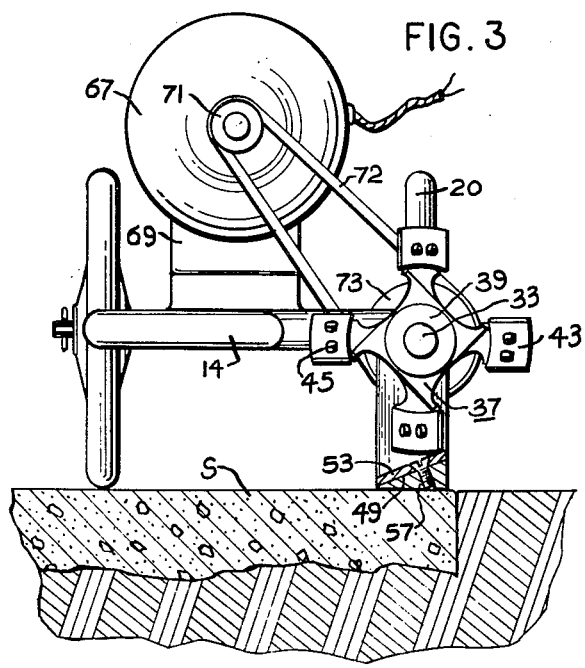
Fig. 3 is a sectional view taken as on the line III—III of Fig. 2 with parts removed for purposes of clarity.

In the operation of lawn edge trimmer 11, motor 67 is turned on, thereby causing the cutter head to rotate rapidly. With the cutter head so rotating, trimmer 11 is pushed forwardly along the edge of the sidewalk S as best shown in Fig. 3 with the outer edge of elongated blade 55 being in close adjacency to the outer edge of the sidewalk. As trimmer 11 is pushed, elongated blade 55 is caused to go between the low-lying grass and the sidewalk. And, as the grass passes rearwardly along the gradual slope of the outer edge 65 of forward portion 59, the grass is caused to move into a standing position and is guided into cutting position between cutter blades 43 and elongated blade 55.

Due to the fact that there is no connection between the wheels 19, 20 and cutter head 37, the rotational speed of cutter head 37 does not depend upon the rate of forward movement of the carrier body 13. This is particularly advantageous since for tough grass the carrier body may be moved slowly along in order to insure proper cutting and with relatively easily cut grass the carrier body may be moved at a faster rate.

From a consideration of the above description, it is seen that the invention provides a lawn edge trimmer which is of simple construction, economical to manufacture, and is highly efficient. Further, it is seen that the grass trimmer requires very little effort to push along. A trimmer constructed in accordance with the present invention cuts the edge of a lawn in an even and neat manner and avoids the digging of unsightly trenches along the edge of the sidewalk, which often occurs in the use of some of the present-day lawn edge trimmers. Additionally, as opposed to a circular type of blade which strikes the edge of the sidewalk and rocks, the lawn edge trimmer of the present invention has a cutting edge which is spaced from the edge of the sidewalk and not likely to be damaged by the sidewalk or by rocks.

Although the invention has been described and illustrated with respect to a preferred embodiment thereof, it is to be understood that it is not to be so limited since changes and modifications can be made therein which are within the full intended scope of the this invention as hereinafter claimed.

We claim:

1. A lawn edge trimmer comprising a wheeled carriage including a carrier body and a pair of wheels rotatably mounted from said body for the support thereof, said trimmer having a side edge adjacent one of said wheels, a handle coupled to said carriage and extending rearwardly thereof whereby said carriage is adapted to be pushed forwardly by hand, said carrier body including a foot member depending from the main portion of the body adjacent said side edge of the trimmer, said foot member including a projection extending forwardly from the main body of the foot member adjacent the lower edge thereof, said projection including an upwardly sloping upper surface with the slope thereof being upwardly toward said one side edge, a drive shaft rotatably mounted in said carrier body and projecting forwardly therefrom, said drive shaft being disposed longitudinally of said carrier body, a cutter head fixedly mounted on said drive shaft for rotation therewith, said cutter head including a plurality of cutter blades, motor means mounted on said carrier body, said motor means including a motor shaft and a first pulley fixedly mounted thereon, said carrier body being provided with a cut-out portion adjacent said drive shaft, said cut-out portion exposing a portion of said drive shaft intermediate the ends thereof, a second pulley fixedly mounted on said drive shaft in said cut-out portion, belt means coupling said first and second pulleys for the rotational drive of said cutter head by said motor means, an elongated fixed blade having an outer edge and an opposite ground engaging edge and having a rearward portion and a tapered forward portion in a twisted disposition relative to said rearward portion, said fixed blade being mounted from said foot member with said rearward portion in face-to-face engagement with said sloping upper surface to hold said rearward portion in a sloping disposition and with said forward portion extending forwardly from said foot member, the twist of said forward portion being such that the forward portion is twisted from an angle of maximum slope adjacent said rearward portion where said outer edge is higher than said ground engaging edge to a substantially horizontal disposition adjacent the distal end thereof whereby providing a means to lift the blades of grass at the lawn edge from a flat position to a standing position when the carriage is being pushed forwardly with the fixed blade moving under the blades of grass, said cutter blades being disposed to engage successively said outer edge of said elongated fixed blade when said cutter head is rotated, said outer edge of said fixed blade being in substantial alignment with said side edge of the lawn edge trimmer and one of said wheels being disposed inwardly of said outer edge of said fixed blade whereby the trimmer is adapted to be pushed along a sidewalk adjacent the edge thereof with said outer edge of the fixed blade and said side edge of the trimmer being substantially parallel with the sidewalk edge for the cutting of the grass extending over the sidewalk edge, and said wheels being independent of said motor means whereby said carriage is movable at a rate independent of the speed of rotation of said cutter head so that for different degrees of toughness and thickness of the grass the speed at which the carriage is pushed is adapted to be varied to compensate therefor.

2. A lawn edge trimmer comprising a wheeled carriage including a carrier body and a pair of wheels rotatably mounted from said body for the support thereof, said trimmer having a side edge, a handle coupled to said carriage and extending rearwardly thereof whereby said carriage is adapted to be pushed forwardly by hand, said carrier body including a foot member depending from the main portion of the body adjacent said side edge of the trimmer, said foot member including a projection extending forwardly from the main body of the foot member adjacent the lower edge thereof, said projection including an upwardly sloping upper surface with the slope thereof being toward said one side, a drive shaft rotatably mounted in said carrier body and projecting forwardly therefrom, said drive shaft extending longitudinally of said carrier body, a cutter head fixedly mounted on said drive shaft for rotation therewith, said cutter head including a plurality of circumferentially spaced cutter blades, motor means mounted on said carried body, said motor means including a motor shaft and a first pulley fixedly mounted thereon, a second pulley fixedly mounted on said drive shaft, belt means coupling said first and second pulleys for the rotational drive of said cutter head by said motor means, an elongated fixed blade having an outer edge and having a rearward portion and a tapered forward portion in a twisted disposition relative to said rearward portion, said fixed blade being mounted from said foot member with said rearward portion in face-to-face engagement with said sloping upper surface to hold said rearward portion in a sloping disposition and with said forward portion extending forwardly from said foot member, the twist of said forward portion being such that the forward portion is twisted from an angle of maximum slope adjacent said rearward portion where said outer edge is higher than said ground engaging edge to a substantially horizontal disposition adjacent the distal end thereof whereby providing a means to lift the blades of grass at the lawn edge from a flat position to a standing position when the carrier body is being pushed forwardly with the fixed blade moving under the blades of grass, said cutter blades being disposed to engage successively said elongated fixed blade when said cutter head is rotated whereby the grass lifted by said forward portion is cut as the carrier body is pushed along the lawn edge, and said wheels being independent of said motor means whereby said carriage is movable at a rate independent of the speed of rotation of said cutter head so that for different degrees of toughness and thickness of the grass the speed at which the carriage is pushed is adapted to be varied to compensate therefor.

3. A lawn edge trimmer comprising a wheeled carriage, including a carrier body and a pair of wheels rotatably mounted from said body for the support thereof, said trimmer having a side edge adjacent one of said wheels, a handle coupled to said carriage and extending rearwardly thereof whereby said carriage is adapted to be pushed forwardly by hand, said carrier body including a foot member depending from the main portion of the body adjacent said side edge of the trimmer, said foot member including a projection extending forwardly from the main body of the foot member adjacent the lower edge thereof, a drive shaft rotatably mounted in said carrier body and projecting forwardly therefrom, said drive shaft being disposed longitudinally of said carrier body, a cutter head fixedly mounted on said drive shaft for rotation therewith, said cutter head including a plurality of circumferentially spaced cutter blades, motor means mounted on said carrier body, said motor means including a motor shaft and a first pulley fixedly mounted thereon, a second pulley fixedly mounted on said drive shaft, belt means coupling said first and second pulleys for the rotational drive of said cutter head by said motor means, an elongated twisted blade mounted from said foot member and extending forwardly therefrom for lifting the blades of grass at the lawn edge from a flat position to a standing position when the carrier body is pushed forwardly with the fixed blade moving under the blades of grass, said cutter blades being disposed to engage successively said fixed blade when said cutter head is rotated whereby the grass lifted by said fixed blade is cut as the carrier body is pushed along the lawn edge, and said wheels being independent of said motor means, whereby said carriage is movable at a rate independent of the speed of rotation of said cutter head so that for different degrees of toughness and thickness of the grass the speed at which the carriage is pushed is adapted to be varied to compensate therefor.

References Cited in the file of this patent

UNITED STATES PATENTS

| | | |
|---|---|---|
| 2,093,413 | Brasted | Sept. 21, 1937 |
| 2,421,558 | Goldsmith | June 3, 1947 |
| 2,782,587 | Ott | Feb. 26, 1957 |
| 2,805,537 | Sturgis | Sept. 10, 1957 |